US006459976B1

(12) United States Patent
Chen et al.

(10) Patent No.: US 6,459,976 B1
(45) **Date of Patent: *Oct. 1, 2002**

(54) METHOD AND SYSTEM FOR CONTROLLING STEADY-STATE SPEED OF HYDRAULIC CYLINDERS IN AN ELECTROHYDRAULIC SYSTEM

(75) Inventors: Chenyao Chen, Glenview, IL (US); Sohel Anwar, Canton, MI (US); Richard G. Ingram, St. Charles, IL (US); Kent C. Bates, Chillicothe, IL (US); Sabri Cetinkunt, Oak Park, IL (US); Unnat Pinsopon, Bangkok (TH)

(73) Assignee: Caterpillar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/575,919

(22) Filed: May 23, 2000

(51) Int. Cl.[7] .......... F16D 31/02

(52) U.S. Cl. .......... 701/50; 91/435; 60/452

(58) Field of Search .......... 701/50; 60/327, 60/420, 426, 452; 91/459, 435, 367, 511; 37/348

(56) References Cited

U.S. PATENT DOCUMENTS

| | | | | |
|---|---|---|---|---|
| 5,002,454 A | | 3/1991 | Hadank et al. | 414/695 |
| 5,155,996 A | * | 10/1992 | Tatsumi et al. | 60/431 |
| 5,160,239 A | | 11/1992 | Allen et al. | 414/699 |
| 5,424,623 A | | 6/1995 | Allen et al. | 318/568.18 |
| 5,537,818 A | * | 7/1996 | Hosseini et al. | 60/327 |
| 5,571,226 A | * | 11/1996 | Kobayashi | 37/348 |
| 5,701,793 A | | 12/1997 | Gardner et al. | 91/361 |
| 5,737,993 A | * | 4/1998 | Cobo et al. | 91/361 |
| 5,784,945 A | * | 7/1998 | Krone t al. | 91/361 |
| 5,974,352 A | * | 10/1999 | Shull | 701/50 |
| 6,047,228 A | * | 4/2000 | Stone et al. | 701/50 |
| 6,098,322 A | * | 8/2000 | Tozawa et al. | 37/414 |
| 6,170,262 B1 | * | 1/2001 | Yaoshimura et al. | 60/452 |

* cited by examiner

*Primary Examiner*—Tan Nguyen
(74) *Attorney, Agent, or Firm*—Howard & Howard; Liza J Meyers

(57) ABSTRACT

A method and system for controlling the steady-state speed of a cylinder in an electrohydraulic system having multiple cylinders includes a plurality of levers for controlling each of the cylinders. A controller, in communication with the levers and the hydraulic cylinders, has a limited number of parameters defining at least one desired relationship between steady-state speed and lever position for each of the cylinders stored therein. The controller further determines a current desired relationship for each of the cylinders from the associated at least one desired relationships. Upon detecting movement of the lever, the controller determines a current position of the lever associated with one of the cylinders and then controls the steady-state speed of the associated cylinder based on the limited number of parameters defining the current desired relationship and the position of the lever.

16 Claims, 4 Drawing Sheets

METHOD AND SYSTEM FOR CONTROLLING STEADY-STATE SPEED OF HYDRAULIC CYLINDERS IN AN ELECTROHYDRAULIC SYSTEM

TECHNICAL FIELD

This invention relates generally to methods and systems for controlling work machines and, more particularly, to methods and systems for controlling the steady-state speed of hydraulic cylinders associated with the work machines.

BACKGROUND ART

A variety of work machines are utilized for construction and excavation work. Examples of such machines include excavators, wheel loaders, front shovels and front end loaders. Each one of these types of machines includes a work implement so that a variety of tasks can be performed. The work implement is supported by a plurality of linkages coupled to hydraulic cylinders.

The machine operator typically uses a plurality of levers to manipulate the work implement and supporting linkages into a variety of positions at different speeds to perform the various tasks that are required on a typical earth moving job. Each cylinder is typically controlled at a steady-state rate for-a given lever position according to a predetermined relationship. This relationship is encoded in a non-volatile memory, such as, but not limited to, Read Only Memory ("ROM"), in a table format. The table is typically large to accommodate the desired steady-state speed of each of the cylinders for a plurality of lever positions. Also, since this table is programmed into ROM or otherwise incorporated in a non-volatile memory, it is inflexible.

Thus, there is a need for efficient use of memory in defining the desired relationship between steady-state speed of a cylinder and lever position and for flexibility in defining the desired relationship.

The present invention is directed to overcome one or more of the problems as set forth above.

DISCLOSURE OF THE INVENTION

In one aspect of this invention, a method is provided for controlling the steady-state speed of a cylinder in an electrohydraulic system having multiple cylinders and multiple levers for controlling each of the cylinders. The method includes storing a limited number of parameters defining at least one desired relationship between steady-state speed and lever position for each cylinder, determining a current desired relationship for each of the cylinders from the associated at least one desired relationship, determining a current position of one of the levers associated with one of the cylinders, and controlling the steady-state speed of one of the cylinders based on the limited number of parameters defining the current desired relationship and the position of the lever.

In another aspect of the invention, a system is also provided for carrying out the steps of the above described method. The system includes a plurality of levers for controlling each of the cylinders in the electrohydraulic system. The system also includes a controller in communication with the levers and the cylinders for storing a limited number of parameters defining at least one desired relationship between steady-state speed and lever position for each cylinder, determining a current desired relationship for each of the cylinders from the associated at least one relationship, determining a current position of one of the levers associated with one of the cylinders, and controlling the steady-state speed of one of the cylinders based on the limited number of parameters defining the current desired relationship and the position of the lever.

BEST MODE FOR CARRYING OUT THE INVENTION

Figure 1:
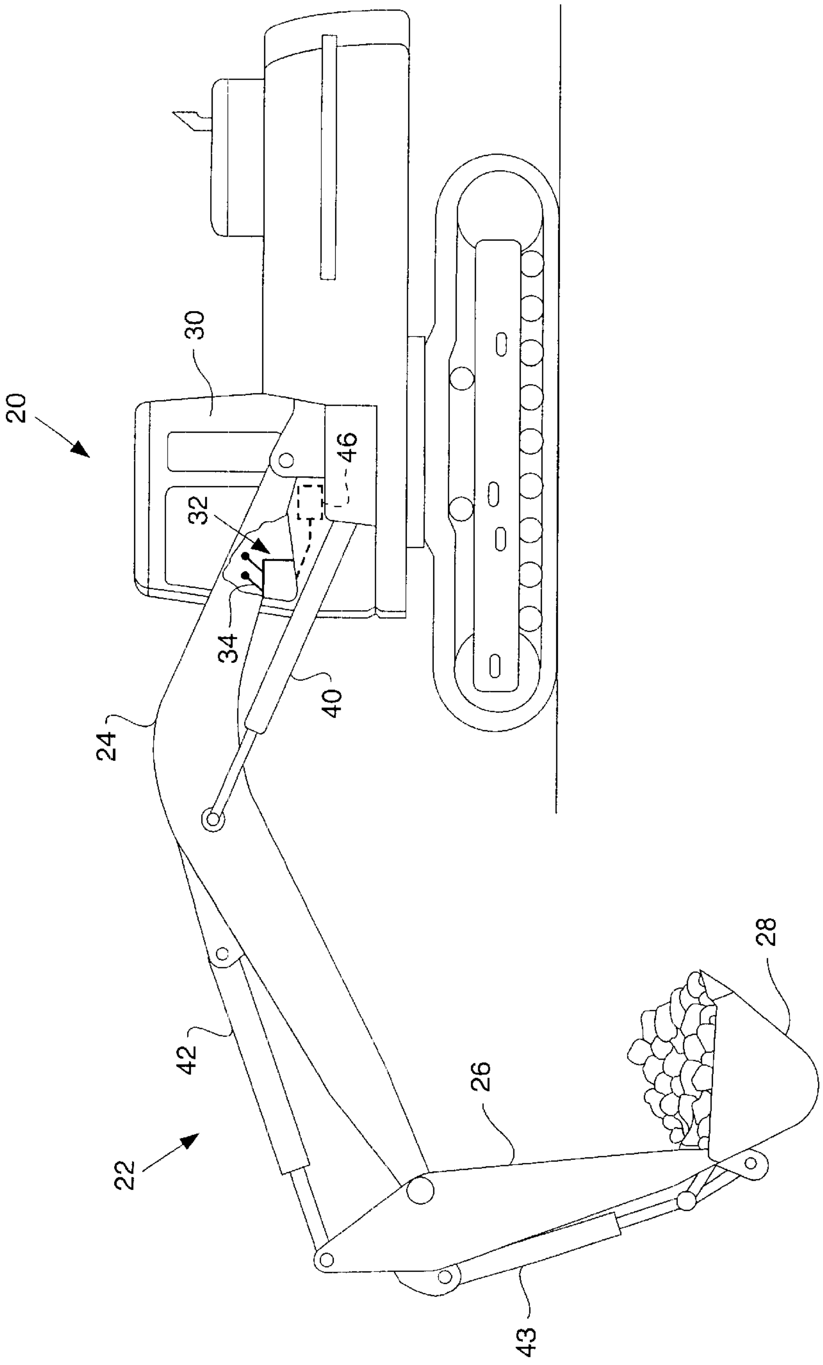
FIG. 1 is a diagrammatic illustration of a work machine.

FIG. 1 diagrammatically illustrates a heavy duty work machine 20. The illustrated work machine is commonly referred to as a hydraulic excavator. It is important to note that this invention is not limited to use with hydraulic excavators. A variety of work machines that require movement of more than one component to complete a work function can be operated using the method and system of this invention. Other types of machines for which this invention is useful include track loaders, wheel loaders, and the like.

The machine 20 includes work implement 22 having moveable members that are moveable into a variety of positions to perform various work functions. The work implement 22 includes lift arm 24, bucket link 26, and work attachment 28, shown here as a bucket.

The work implement 22 is supported by the machine body portion 30, which houses the engine and supports an operator compartment. A control panel 32 is positioned within the operator compartment so that the operator can manipulate a plurality of levers 34 to move the work implement 22 at various speeds through a series of positions.

The lift arm 24 is moved relative to the machine body portion 30 by hydraulic cylinder 40, which is normally controlled bucket link 26 is moved relative to the lift arm 24 through hydraulic cylinder 42 and the work attachment 28 is moved relative to the lift arm 24 through hydraulic cylinder 42 and bucket link 26. The levers 34 enable the operator to control the speed of operation of a respective one of the hydraulic cylinders 40,42,43 for manipulating the work implement 22.

Figure 2:
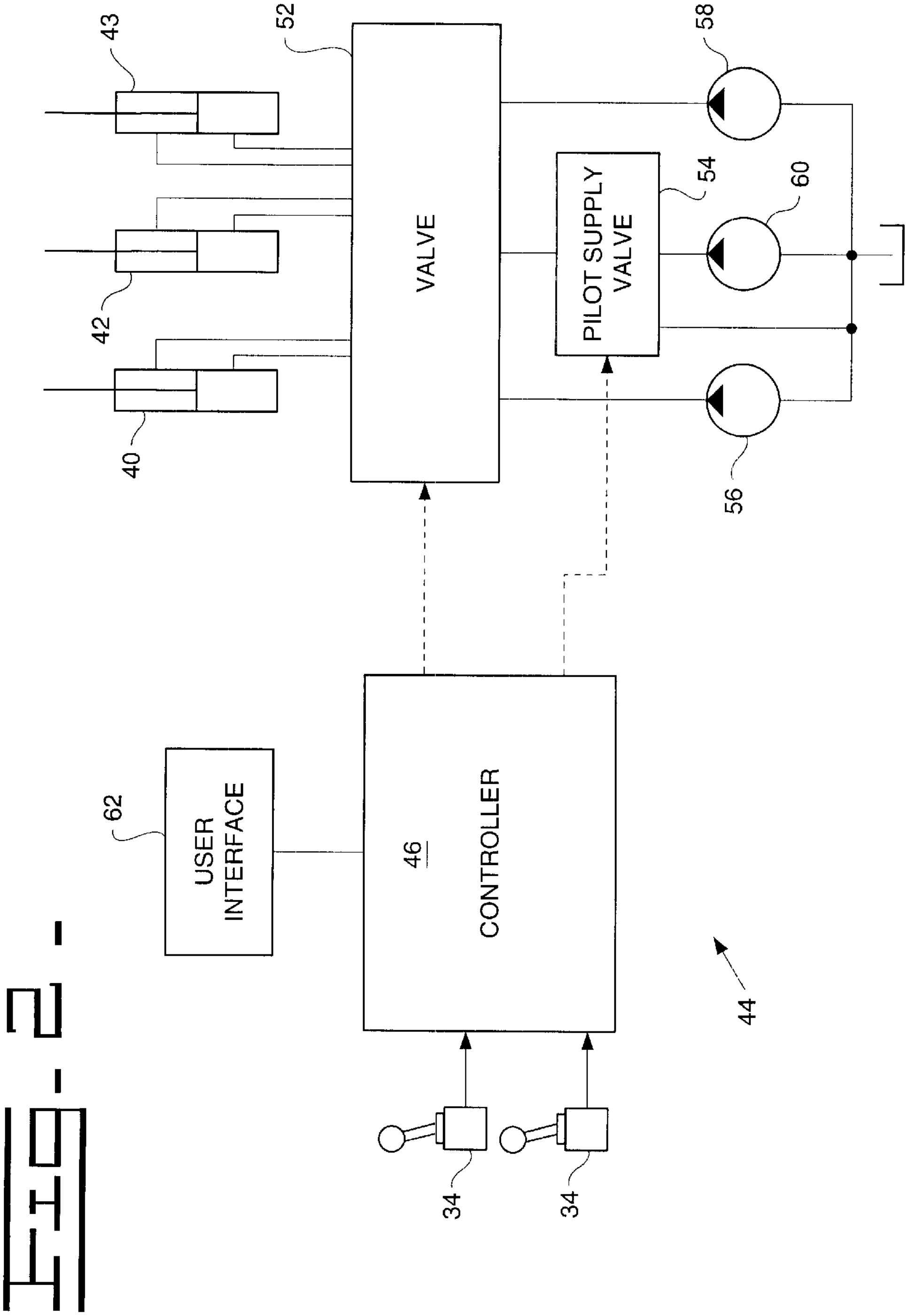
FIG. 2 is a block diagram of an electrohydraulic control system according to the present invention.

With reference to FIG. 2, an implement control system 44 of the present invention as applied to a wheel type loader is diagrammatically illustrated. The implement control system 44 is adapted to sense a plurality of inputs and responsively produce output signals that are delivered to various actuators in the control system. Preferably, the implement control system 44 includes a microprocessor-based controller 46.

The operator positions levers 34 to control the speed of movement of the hydraulic cylinders in order to manipulate the work attachment 28 and the work implement 22. Thus, the controller 46 is coupled to a valve 52 for controlling the speed of the flow of fluid in the hydraulic cylinders 40,42,43.

The valve 52 may include multiple main valves (for example, two main valves for each of the hydraulic cylinders 40,42,43) and multiple electrically actuated pilot valves (for example, two pilot or secondary valves for each main valve). The main valves direct pressurized fluid to the cylinders 40,42,43 and the pilot valves direct pilot fluid flow to the main valves. Each pilot valve is electrically connected to the controller 46. At least one main pump 56, 58 is used to supply hydraulic fluid to the main spools, while a pilot pump 60 is used to supply hydraulic fluid to the pilot valves. A pilot supply valve 54, also coupled to the controller 46, is included to control pilot fluid flow to the pilot valves.

The controller 46 preferably includes a non-volatile memory, shown here as RAM and ROM modules, that stores software programs to carry out certain features of the present invention. The controller 46 receives the operator lever position signals from the levers 34 and responsively produces control signals to control the respective hydraulic cylinders 40,42,43 at a desired steady-state speed. The valve 52 receives the control signals and controllably provides hydraulic fluid flow to the respective hydraulic cylinder in response to the position of the levers 34.

Figure 3A:
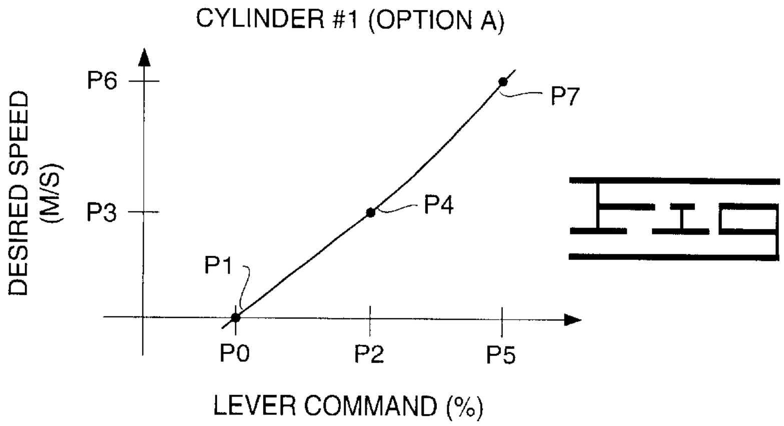
FIGS. 3*a*–3*c* are graphs illustrating desired relationships between steady-state speed of a cylinder and various relevant lever positions associated with the cylinder.
Figure 3B:
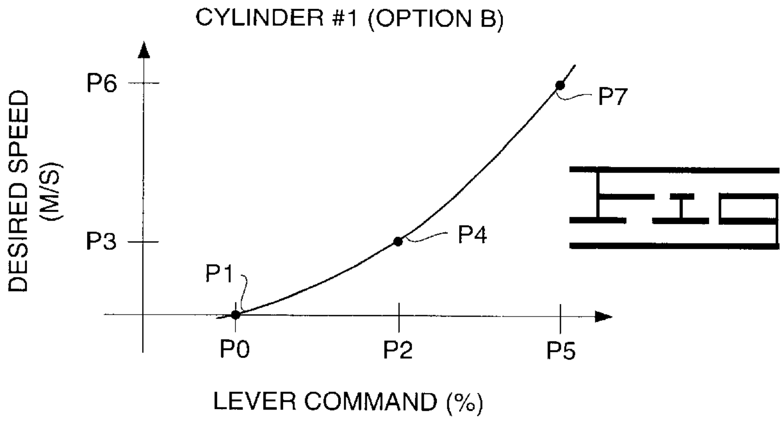
Figure 3C:
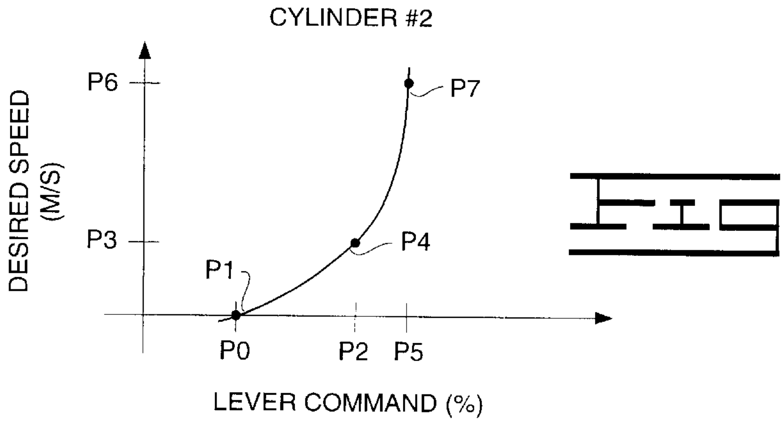

The steady-state speed of a hydraulic cylinder is governed by the relative movement of the lever 34 associated with that cylinder 40,42,43. This relationship may vary from cylinder to cylinder and may vary depending on the application of the cylinder in a specific work machine. FIGS. 3*a*–3*c* are graphs illustrative of possible desired relationships between steady-state speed of a given cylinder 40,42,43 and relevant positions of the lever 34 associated with the cylinder 40,42,43. A cylinder 40,42,43 may have one desired relationship for one application and an entirely different desired relationship when used in a different application, as shown in FIGS. 3*a* and 3*b*. Also, a first cylinder 40,42,43 may have an entirely different desired relationship than a second cylinder 40,42,43 as shown in FIG. 3*c*. When a cylinder 40,42,43 has multiple desired relationships to select from, the selection can be made automatically based on a configuration of the system, or manually by the user via an appropriate user interface 62, as shown in FIG. 2.

Only a few parameters defining the desired relationship between steady-state speed of the cylinder 40,42,43 and various positions of its corresponding lever 34 are stored in memory in controller 46 for a few key, or relevant, lever positions. For example, one key position of the lever corresponds to the end of a dead band segment. That is, up to this position, it is desirable not to have the cylinder move at all during the first part of the lever's travel. Thus, at P0 the desired speed equals 0 and the slope P1 at this point is determined and stored in memory. The remaining relevant parameters are arbitrarily chosen and the corresponding desired steady-state speed and slope values are determined and also stored in memory. The desired steady-state speed of each of the cylinder can then be determined from these few parameters for any given lever position as described in greater detail below.

Equations are now defined for determining coefficients that are dependent upon the slope values and the relevant lever positions for each of the desired relationships. These equations are as follows:

$$C1=((P0-P2)*(P1+P4)+2*P3)/((P0-P2)*(P0-P2)*(P0-P2))$$

$$C2=0.5*(P1-P4)/(P0-P2)-1.5*(P0+P2)*C1$$

$$C3=P1-3*C1*P0*P0-2*C2*P0$$

$$C4==-C1*P0*P0*P0-C2*P0*P0-C3*P0$$

$$D1=((P2-P5)*(P4+P7)-2*(P3-P6))/((P2-P5)*(P2-P5)*(P2-P5)$$

$$D2=0.5*(P4-P7)/(P2-P5)-1.5*(P2+P5)*D1$$

$$D3=P4-3*D1*P2*P2*-2*D2*P2$$

$$D4=P3-D1*P2*P2*P2-D2*P2*P2-D3*P2,$$

where P0 is the position of the lever up to which no movement of the cylinder occurs; P1 is slope at P0; P2 is a relevant lever position; P3 is the desired steady-state speed at P2; P4 is the slope at P2, P3; P5 is another relevant lever position; P6 is the desired steady-state speed at P5; and P7 is the slope at P5, P6.

Figure 4:
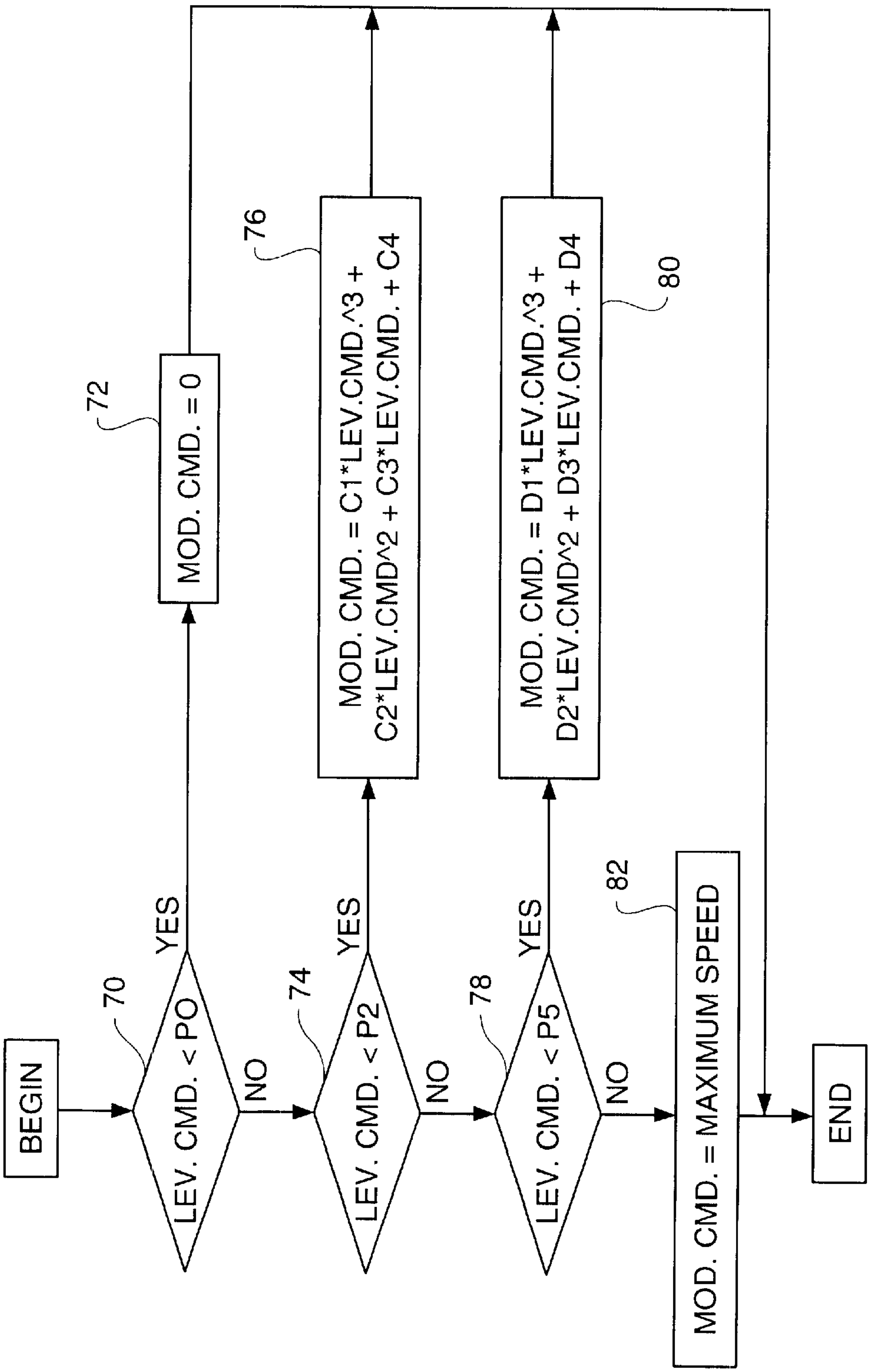
FIG. 4 is a flow chart diagram illustrating a preferred embodiment of this invention.

Control of the cylinder 40,42,43 at the desired steady-state speed according to the position of the lever 34 is performed according to the flow diagram shown in FIG. 4. Upon detecting movement of the lever, controller 46 determines if the lever command, or position, is less than P0 as shown at conditional block 70. As mentioned above, this initial point P0 corresponds to the end of the dead band segment wherein no movement of the cylinder is to occur up to this lever position. Therefore, if the lever command is less than P0 the modulation command to the cylinder is 0 as shown at block 72.

If the lever command exceeds P0, a determination is made as to whether or not the lever command is less than P2, i.e., one of the pre-selected relevant parameters, as shown at conditional block 74. If so, the modulation command to the hydraulic cylinder 40,42,43 is determined according to the equation shown at block 76, wherein C1, C2, C3 and C4 are determined according to the equations discussed above.

If the lever command exceeds P2, a determination is made as to whether or not the lever command is less than P5, as shown at conditional block 78. If so, the modulation command is determined according to the equation as shown at block 80, wherein D1, D2, D3 and D4 are determined according to the equations discussed above.

If the lever command exceeds P5, then the modulation command equals maximum speed to the hydraulic cylinder 40,42,43, as shown at block 82. That is, the lever 34 has been moved to its full travel segment and it is desirable to move the cylinder 40,42,43 at full speed.

Of course, various modifications of this invention would come within the scope of the invention. The main fundamental concept is to minimize memory usage in defining desired relationships between steady-state speed of a cylinder and relevant positions of its lever 34, while still allowing flexibility in changing the desired relationship.

Industrial Applicability

In determining how to control the steady-state speed of a cylinder 40,42,43 in response to movement of the lever 34 associated therewith, desired relationships between the steady-state speed of the cylinder 40,42,43 and the various positions of the lever 34 are determined. These relationships may vary depending on the application of the work machine or on the cylinder 40,42,43. These relationships are then stored in a memory in the controller 46 via a few relevant parameters representative of the desired relationships. The relevant parameters are identified by relevant lever positions, desired steady-state speed and the slope at the intersection of those two points. Also, a few equations defining coefficients that are dependent upon the slope values and the position of the lever 34 is also stored in memory in the controller 46.

In operation, the controller determines the position of the lever and calculates the coefficients according to the equations, the slope values and the relevant parameters accordingly. The coefficients are then utilized to determine the desired steady-state speed to be achieved by the cylinder in response to the lever command from the operator.

Other aspects, objects and advantages of this invention can be obtained from a study of the drawings, the disclosure and the appended claims.

What is claimed is:

1. A method for controlling the steady-state speed of a cylinder in an electrohydraulic system having multiple cylinders and multiple levers for controlling each of the cylinders, the method comprising:

storing a limited number of parameters defining at least one application-specific desired relationship between steady-state speed and lever position for each cylinder;

manually choosing a current desired relationship for each of the cylinders from the associated at least one application-specific desired relationship;

determining a current position of one of the levers associated with one of the cylinders; and controlling the steady-state speed of the one of the cylinders based on the limited number of parameters defining the current desired relationship and the position of the lever.

2. The method as recited in claim 1 wherein storing the limited number of parameters includes identifying predetermined relevant lever positions.

3. The method as recited in claim 2 wherein storing the limited number of parameters further includes determining slope values corresponding to the desired relationships between steady-state speed of the cylinder and the relevant lever positions.

4. The method as recited in claim 3 wherein identifying the predetermined relevant lever positions includes identifying a dead band position corresponding to a position of the lever wherein no motion of the cylinder occurs prior thereto.

5. The method as recited in claim 3 wherein storing the limited number of parameters further includes defining a plurality of equations to obtain coefficients dependent on the slope values and the lever position.

6. The method as recited in claim 5 wherein controlling the steady-state speed of the one of the cylinders includes determining the coefficients based on the plurality of equations and the position of the lever.

7. The method as recited in claim 1 wherein determining the current position of one of the levers includes determining a relative position of the lever from a starting position.

8. The method as recited in claim 1 wherein determining the current desired relationship includes receiving a signal selecting one of the desired relationships from the at least one application-specific desired relationship.

9. A system for controlling the steady-state speed of a cylinder in an electrohydraulic system having multiple cylinders, the system comprising:

a plurality of levers for controlling each of the cylinders; and a controller for storing a limited number of parameters defining at least one application-specific desired relationship between steady-state speed and lever position for each cylinder, manually choosing a current desired relationship for each of the cylinders from the associated at least one application-specific desired relationship, determining a current position of one of the levers associated with one of the cylinders, and controlling the steady-state speed of the one of the cylinders based on the limited number of parameters defining the current desired relationship and the position of the lever.

10. The system as recited in claim 9 wherein the controller, in storing the limited number of parameters, is further operative to store predetermined relevant lever positions.

11. The system as recited in claim 10 wherein the controller, in storing the limited number of parameters, is further operative to determine slope values corresponding to the desired relationship between steady-state speed of the cylinder and the relevant lever positions.

12. The system as recited in claim 11 wherein the controller, in storing the predetermined relevant lever positions, is further operative to store a dead band position corresponding to a position of the lever wherein no motion of a cylinder occurs prior thereto.

13. The system as recited in claim 11 wherein the controller, in storing the limited number of parameters, is further operative to store a plurality of equations for obtaining coefficients that are dependent upon the slope values and the lever positions.

14. The system as recited in claim 13 wherein the controller, in controlling the steady-state speed of the one of the cylinders, is further operative to determine the coefficients based on the plurality of equations and the position of the lever.

15. The system as recited in claim 9 wherein the controller, in determining the current position of one of the levers, is operative to determine a relative position of the lever from a start position.

16. The system as recited in claim 9 wherein the controller, in determining the current desired relationship, is further operative to receive a signal selecting one of the desired relationships from the at least one of the application-specific desired relationships.

* * * * *